Patented Oct. 27, 1953

2,657,223

UNITED STATES PATENT OFFICE 2,657,223

PROCESS FOR THE PREPARATION OF COMPOUNDS WITH SEMICYCLIC DOUBLE BOND

Leopold Ruzicka and Oskar Jeger, Zurich, Switzerland, assignors to Ciba Pharmaceutical Products, Inc., Summit, N. J.

No Drawing. Application October 4, 1949, Serial No. 119,574. In Switzerland October 11, 1948

6 Claims. (Cl. 260—397.5)

1

The present invention relates to the manufacture of compounds with semi-cyclic double bond. The process of manufacture of the invention is by reducing $\alpha:\beta$-unsaturated cycloalkenyl carbonyl compounds according to the method of Wolff-Kishner.

The designation $\alpha:\beta$-unsaturated cyclo-alkenyl carbonyl compounds refers to aldehydes and ketones which exhibit the grouping

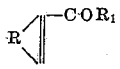

in which R indicates the remaining members of a cyclo-aliphatic ring and —COR$_1$ is the aldehyde group or the residue of a ketone.

The cyclo-aliphatic ring can be unsubstituted, substituted or can form a part of a condensed ring system. The process is of special value when applied to starting materials which belong to the steroid series, for example $\Delta^{16}$-androstenyl-(17)-aldehydes and $\Delta^{16}$-androstenyl-(17)-ketones, such as alkyl ketones, primarily $\Delta^{16}$-androstenyl-(17)-methyl-ketones. In this case such steroid compounds are preferably employed which contain further substituents, such as free, etherified or esterified hydroxyl groups, particularly in 3-, 11-, 12-, 14- and/or 21-position. They can also contain additional double bonds, such as in 5:6-, 11:12- or 14:15-position. Any further keto groups present can either be likewise reduced or temporarily protected by conversion for example into their enol derivatives or acetals. In so far as the compounds employed as starting materials are new they are obtained according to customary methods.

The Wolff-Kishner reduction can be carried out under the conditions known for this reaction (cf. for example R. Adams, Organic Reactions, vol. IV, page 378, New York (1948)). Thus the reaction can be carried out with hydrazine and alcoholates of mono- and bi-valent metals, for example of alkali metals such as sodium ethylate in the presence or absence of solvents, as for example aliphatic alcohols, such as ethanol, diethylene glycol or triethylene glycol, or dioxane, the process being preferably conducted in anhydrous solvents. Also alternatively the carbonyl compounds may be reduced by heating an aqueous solution of hydrazine, an alkali hydroxide and a high boiling solvent, such as diethylene glycol or triethylene glycol. Nitrogen-containing carbonyl derivatives, such as hydrazones, oximes or semicarbazones can be first produced and these correspondingly further treated. The reaction takes place in most cases merely on heating, in certain cases it is of advantage however for acceleration of the reaction to heat the reaction mixture under pressure.

2

In the Wolff-Kishner reduction to be carried out according to the present process there takes place in addition to the reduction of the carbonyl group a displacement of the double bond, according to the formulae:

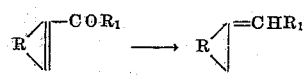

There are therefore obtained according to the present invention in an advantageous manner very valuable compounds with semi-cyclic double bond. The latter can for example be split up oxidatively, whereby ring ketones are obtained. The new process is of great importance especially in the steroid series in that for example from 20-keto-pregnanes valuable intermediate products can be produced for the manufacture of 17-keto-compounds of the androstane series.

The following examples illustrate the invention, the relation between parts by weight and parts by volume being the same as that between the kilogram and liter:

EXAMPLE 1

*2-methylene-cholestane*

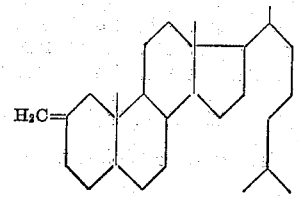

1.5 parts by weight of $\Delta^2$-2-formyl-cholestane are boiled for ½ hour under reflux with 9 parts by volume of hydrazine hydrate and 80 parts by volume of absolute ethyl alcohol and subsequently heated in a sealed tube overnight to 200° C. with sodium ethylate prepared from 4 parts by weight of sodium and 100 parts by volume of absolute ethyl alcohol. After cooling, the whole is poured into water and the precipitated reaction product chromatographed on aluminum oxide. The petrol ether eluates are combined and recrystallized from chloroform-methanol. The 2-methylene-cholestane thus obtained melts at 65-67° C.

EXAMPLE 2

*Methylene-cyclopentane*

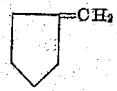

1 part by weight of $\Delta^1$-cyclopentene aldehyde is heated overnight to 170° C. in a sealed tube with 2 parts by weight of hydrazine hydrate and 3 parts by weight of sodium ethylate in 10 parts by volume of ethyl alcohol. Then the whole is poured into water and the reaction product extracted with ether. The methylene-cyclopentane obtained by evaporation of the washed and dried ether solution boils under normal pressure at 78–81° C.

EXAMPLE 3

$\Delta^{5:17}$-3$\beta$-acetoxy-pregnadiene

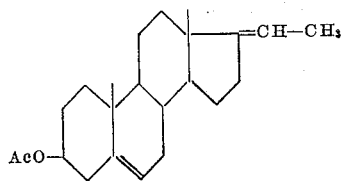

3 parts by weight of $\Delta^{5:16}$-3$\beta$-acetoxy-pregnadiene-20-one are heated in a sealed tube with a mixture of 2 parts by weight of hydrazine hydrate, 1 part by weight of sodium ethylate and 200 parts by volume of ethyl alcohol. The reaction mixture is thereupon poured into water and extracted with ether. By evaporation of the washed and dried ether solution the crude reaction product is obtained which for the purpose of acetylation of hydrolyzed acetoxy groups is treated in the customary manner with pyridine and acetic anhydride. By chromatography and crystallization of the acetylation product from dilute acetone the $\Delta^{5:17}$-3$\beta$-acetoxy-pregnadiene is obtained in the form of needles of melting point 138–140° C.

EXAMPLE 4

Methylene-cyclopentane

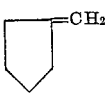

1 part of $\Delta^1$-cyclopentene-aldehyde-semi-carbazone of melting point 124° C. is heated to 170–180° C. in a closed tube with 3 parts of potassium ethylate in 10–15 parts by volume of methanol. The methylene-cyclopentane which is formed is separated from the reaction mixture.

EXAMPLE 5

Methylene-cycloheptane

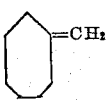

1 part of $\Delta^1$-cycloheptene-aldehyde-semicarbazone of melting point 204° C. is heated in a closed tube with 3 parts of sodium hydroxide in 15–20 parts by volume of ethanol. By working up one obtains methylene-cycloheptane which melts at 137–138° C.

EXAMPLE 6

Methylene-cyclopentadecane

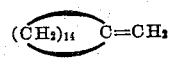

2 parts of hydroxylamine in 20 parts by volume of a 10 per cent solution of sodium ethylate are added to 1 part by weight of $\Delta^1$-cyclopentadecene-aldehyde and the whole is heated to 170–180° C. Upon working up a quantitative yield of methylene-cyclopentadecane is obtained.

EXAMPLE 7

2,2,6-trimethyl-1-methylene-cyclohexane

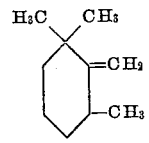

1 part of $\beta$-cyclo-citral is heated briefly with 2 parts of hydrazine hydrate in 15 parts by volume of alcohol, and the solution heated in a sealed vessel to 150–180° C. with 3 parts of potassium ethylate. The resultant 2,2,6-trimethyl-1-methylene-cyclohexane boils at 65–68° C. under 11 mm. pressure.

EXAMPLE 8

$\gamma$-cyclo-geraniol

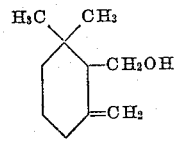

By treating $\Delta^3$-1,1-dimethyl-2-hydroxymethyl-3-formylcyclohexene with hydrazine hydrate in a manner analogous to that described in Example 7, there is obtained $\gamma$-cyclo-geraniol boiling at 98–100° C. under 11 mm. pressure.

EXAMPLE 9

$\gamma$-dihydro-ionol

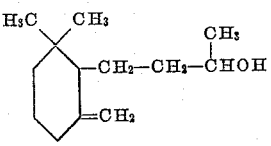

1 part of $\Delta^3$-1,1-dimethyl-2-[3'-hydroxybutyl-(1')]-3-formyl-cyclohexene-semicarbazone of melting point 212–213° C., when treated with 4 parts of hydrazine and 4 parts of potassium ethylate in 20 parts by volume of methanol, yields $\gamma$-dihydro-ionol boiling at 128–131° C. under 12 mm. pressure.

EXAMPLE 10

2-methylene-cholestane

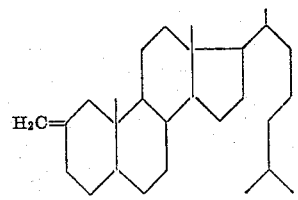

1 part of the oxim of $\Delta^2$-2-formyl-cholestene of melting point 163–164° C., when heated to 170° C. with 2 parts of hydrazine hydrate and 10 parts by volume of 10 per cent. sodium ethylate, yields the 2-methylene-cholestane.

EXAMPLE 11

Ethylidene-cyclohexane

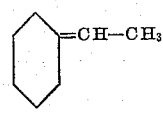

Under the conditions described in Examples 5, 6 and 7, $\Delta^1$-tetrahydro-acetophenone and derivatives thereof yield ethylidene-cyclohexane melting at 133–135° C. under 760 mm. pressure.

Having thus described the invention, what is claimed is:

1. A process for the preparation of a compound with a semi-cyclic double bond, which comprises subjecting an α:β-unsaturated cyclo-alkenyl carbonyl compound to the conditions of the Wolff-Kishner reaction, whereby the oxo group of the aforesaid cyclo-alkenyl carbonyl compound is replaced by hydrogen and the double bond shifted into the semi-cyclic position.

2. A process for the treatment of a compound with a semi-cyclic double bond, which comprises heating a functionally converted α:β-unsaturated cyclo-alkenyl carbonyl compound representing a member of the group consisting of oximes, hydrazones and semicarbazones with an alkali metal and an alcohol, whereby the oxo group of the aforesaid cyclo-alkenyl carbonyl compound is replaced by hydrogen and the double bond shifted into the semi-cyclic position.

3. A process for the preparation of a compound with a semi-cyclic double bond, which comprises subjecting an α:β-unsaturated cyclo-alkenyl carbonyl compound of the steroid series to the conditions of the Wolff-Kishner reaction, whereby the oxo group of the aforesaid cyclo-alkenyl carbonyl compound is replaced by hydrogen and the double bond shifted into the semi-cyclic position.

4. A process for the preparation of a compound with a semi-cyclic double bond, which comprises heating a functionally converted α:β-unsaturated cyclo-alkenyl carbonyl compound of the steroid series representing a member of the group consisting of oximes, hydrazones and semicarbazones with an alkali metal and an alcohol, whereby the oxo group of the aforesaid cyclo-alkenyl carbonyl compound is replaced by hydrogen and the double bond shifted into the semi-cyclic position.

5. A process for the preparation of a compound with a semi-cyclic double bond, which comprises subjecting a $\Delta^{16}$-androstenyl and methyl-ketone to the conditions of the Wolff-Kishner reaction, whereby the oxo group of the aforesaid cyclo-alkenyl carbonyl compound is replaced by hydrogen and the double bond shifted into the semi-cyclic position.

6. A process for the preparation of a compound with a semi-cyclic double bond, which comprises heating a functionally converted carbonyl derivative of $\Delta^{16}$-androstenyl methyl-ketone representing a member of the group consisting of oximes, hydrazones and semicarbazones with an alkali metal and an alcohol, whereby the oxo group of the aforesaid cyclo-alkenyl carbonyl compound is replaced by hydrogen and the double bond shifted into the semi-cyclic position.

LEOPOLD RUZICKA.
OSKAR JEGER.

References Cited in the file of this patent

UNITED STATES PATENTS

| Number | Name | Date |
|---|---|---|
| 2,306,635 | Marker | Dec. 29, 1942 |
| 2,335,616 | Tendick et al. | Nov. 30, 1943 |
| 2,471,697 | Minlon | May 31, 1949 |

OTHER REFERENCES

Gilman et al., Jour. Am. Chem. Soc., 55, 2903–2909 (1933).

Hawthorn, Journ, Chem. Coc., 1936, 763–765.

Adams et al., "Organic Reactions," vol. IV, pp. 378–391 (1948).